(12) United States Patent
Li et al.

(10) Patent No.: US 12,504,060 B2
(45) Date of Patent: Dec. 23, 2025

(54) LINEAR DRIVING MECHANISM

(71) Applicants: AAC Acoustic Technologies (Shanghai) Co., Ltd., Shanghai (CN); Beijing Xiaomi Robot Technology Co., Ltd., Beijing (CN)

(72) Inventors: Chunjiang Li, Shanghai (CN); Yuntong Li, Shanghai (CN); Bing Xie, Shanghai (CN); Liang Jiang, Shanghai (CN); Chuiyou Zhou, Shanghai (CN)

(73) Assignees: AAC Acoustic Technologies (Shanghai) Co., Ltd., Shanghai (CN); Beijing Xiaomi Robot Technology Co., Ltd., Beijing (CN)

( * ) Notice: Subject to any disclaimer, the term of this patent is extended or adjusted under 35 U.S.C. 154(b) by 0 days.

(21) Appl. No.: 18/805,549

(22) Filed: Aug. 15, 2024

(65) Prior Publication Data

US 2025/0230861 A1    Jul. 17, 2025

Related U.S. Application Data

(63) Continuation of application No. PCT/CN2024/075240, filed on Feb. 1, 2024.

(30) Foreign Application Priority Data

Jan. 11, 2024   (CN) .......................... 202410046311.5

(51) Int. Cl.
*F16H 25/20* (2006.01)
*F16H 25/22* (2006.01)
*H02K 7/06* (2006.01)
*H02K 7/08* (2006.01)
*H02K 11/215* (2016.01)
*H02K 21/14* (2006.01)

(52) U.S. Cl.
CPC ..... *F16H 25/2252* (2013.01); *F16H 25/2015* (2013.01); *F16H 25/2204* (2013.01); *H02K 7/06* (2013.01); *H02K 7/083* (2013.01); *H02K 11/215* (2016.01); *H02K 21/14* (2013.01); *F16H 2025/2031* (2013.01); *F16H 2025/2075* (2013.01)

(58) Field of Classification Search
CPC ......... F16H 2025/2075; F16H 25/2252; F16H 2025/2078
See application file for complete search history.

(56) References Cited

U.S. PATENT DOCUMENTS

| 10,090,730 | B2 * | 10/2018 | Rudy | ........................ H02K 1/22 |
| 11,101,716 | B2 * | 8/2021 | Matsuto | ................... F16C 19/32 |
| 2005/0247150 | A1 * | 11/2005 | Tsubono | ............. F16H 25/2266 |
| | | | | 74/424.92 |

* cited by examiner

*Primary Examiner* — Gregory Robert Weber
(74) *Attorney, Agent, or Firm* — Wiersch Law Group

(57) ABSTRACT

This invention provides a linear driving mechanism having a housing, front and rear covers fixed at opposite ends of the housing, a stator arranged inside the housing, and a hollow rotor arranged inside the stator, driven by the stator to rotate. The linear driving mechanism further includes a rolling lead screw fitted inside the rotor, a first bearing, and a second bearing. The rolling lead screw includes a central screw rod and a screw nut. The screw nut is fixedly sleeved around the inner peripheral side of the rotor near the front cover. The linear driving mechanism of the present invention can enhance the integration of the rolling lead screw and rotor to reduce the volume space of the linear driving mechanism, meeting the demand for miniaturization.

8 Claims, 5 Drawing Sheets

A—A

B-B

LINEAR DRIVING MECHANISM

TECHNICAL FIELD

The present invention relates to the field of linear drive technology, particularly to a linear driving mechanism.

BACKGROUND

The current artificial intelligence industry and robotics industry are developing rapidly. Due to high requirements such as space and energy efficiency, stricter limitations need to be imposed on linear actuators. Linear actuators are now developing towards high integration, compact size, high load capacity, and fast response. The linear driving mechanism is a type of linear actuator that mainly uses a central screw rod as the driven part, with a nut as the linear output, that is, the screw rod and nut move telescopically along the axis.

Most standard linear screw drive mechanisms use coaxial coupling, where the motor is connected to the rotating shaft through gears or couplings, to drive the screw nut to move axially forward or backward.

The above linear screw drive mechanism includes a motor, a central screw rod, and a screw nut connected to the central screw rod for linear motion. The central screw rod and screw nut in the relevant technologies are assembled, and the screw nut is not assembled with other components, resulting in a lower degree of integration of the linear screw drive mechanism and greatly increasing the overall structural volume space, which cannot meet the requirements for miniaturization.

Therefore, it is necessary to provide a new linear driving mechanism to solve the above technical problems.

SUMMARY

The purpose of the present invention is to provide a linear driving mechanism to solve the low integration of linear driving mechanisms in related technologies, resulting in a large overall structure volume that cannot meet the demand for miniaturization.

To achieve the above purposes, the present invention provides a linear driving mechanism comprising: a housing; a front cover and a rear cover fixed respectively at opposite ends of the housing; a stator inside the housing; a hollow rotor inside the stator for being driven to rotate by the stator; a rolling lead screw sleeved inside the rotor; a first bearing sleeved on the rotor and fixed at one end of the rear cover; and a second bearing sleeved on the rolling lead screw and fixed inside the housing. The rolling lead screw comprises a central screw rod set on an inner peripheral side of the rotor and passing through the center of the front cover, and a screw nut forming a transmission pair with the central screw rod. The screw nut is fixedly sleeved around the inner peripheral side of the rotor near the front cover end; and the rotor drives the screw nut to rotate, thereby driving the central screw rod to achieve a linear telescopic movement.

As an improvement, the rolling lead screw is a planetary rolling screw; the screw nut includes an internal thread structure on one side close to the central screw rod; the central screw rod includes a screw body set on the inner peripheral side of the rotor and an extension portion extending from one end of the screw body near the front cover; an outer peripheral side of the screw body includes an external thread structure; the screw nut is meshed with the external thread structure of the screw body through the internal thread structure for performing a rotational connection.

As an improvement, the rolling lead screw further includes a first and second gear rings fixed at the two ends of an inner peripheral side of the screw nut, and a plurality of annular lead screw columns spaced around the central lead screw, each annular lead screw column having lead screw external thread structures on an outer peripheral side thereof, each end of each annular lead screw column is respectively set in the first gear ring and the second gear ring to form a rotational connection; the lead screw external thread structures of each annular lead screw column respectively mesh with the external thread structures of the lead screw body, and the lead screw external thread structures of each annular lead screw column also respectively mesh with the internal thread structures of the screw nut; the internal thread structure of the screw nut is formed at an inner periphery of a middle portion of the screw nut.

As an improvement, the rolling lead screw is a ball screw rod with multiple first ball grooves formed by recesses arranged at intervals on one side of the screw nut close to the central screw rod; the central screw rod includes a screw rod body arranged on the rotor and an extension portion extending from one end of the screw rod body near the front cover, with multiple second ball grooves formed by recesses arranged at intervals on the outer peripheral side of the screw rod body; the rolling lead screw also includes a plurality of balls, each of which is interposed between a first ball groove and a second ball groove to form a rolling connection between the screw nut and the screw rod body.

As an improvement, a length of the screw body equals a length of the motor, and the screw nut is fixed at an end of the rotor near the front cover.

As an improvement, the first bearing and the second bearing are respectively located on the opposite sides of the stator and spaced apart from the stator; an outer wall of the rotor protrudes for forming a shaft stop; one end of the second bearing near the front cover abuts against the front cover; and one end of the second bearing far from the front cover abuts against the shaft stop.

As an improvement, a motor formed by the stator and the rotor together is an 8-pole-9-slot structure, or a 10-pole-12-slot structure, or a 14-pole-12-slot structure, or a 16-pole-12-slot structure.

As an improvement, the rotor comprises a hollow rotor shaft disposed within the housing and a plurality of permanent magnets spaced apart and fixed to the outer wall of the rotor shaft; the multiple permanent magnets are spaced apart from the stator; the first bearing and the second bearing are respectively sleeved on the rotor shaft; and the screw nut is fixedly sleeved around the inner peripheral side of the rotor shaft near the front cover.

As an improvement, the linear driving mechanism further comprises a position sensor, wherein the position sensor comprises a collecting part fixed to the rear cover and a rotating part fixed to one end of the rotor near the rear cover, with the collecting part being opposite and spaced from the rotating part.

As an improvement, the linear driving mechanism further includes a bottom cover which is fixedly sleeved around and sealing an end of the rotor near the rear cover, wherein the rotating part is fixed with the bottom cover.

Compared with existing technologies, the linear driving mechanism of the present invention integrates the screw rod and the rotor. This not only reduces the volume of the linear driving mechanism to meet the requirements of miniaturization, but also increases the bearing capacity of the screw rod.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

First Embodiment

Figure 1:
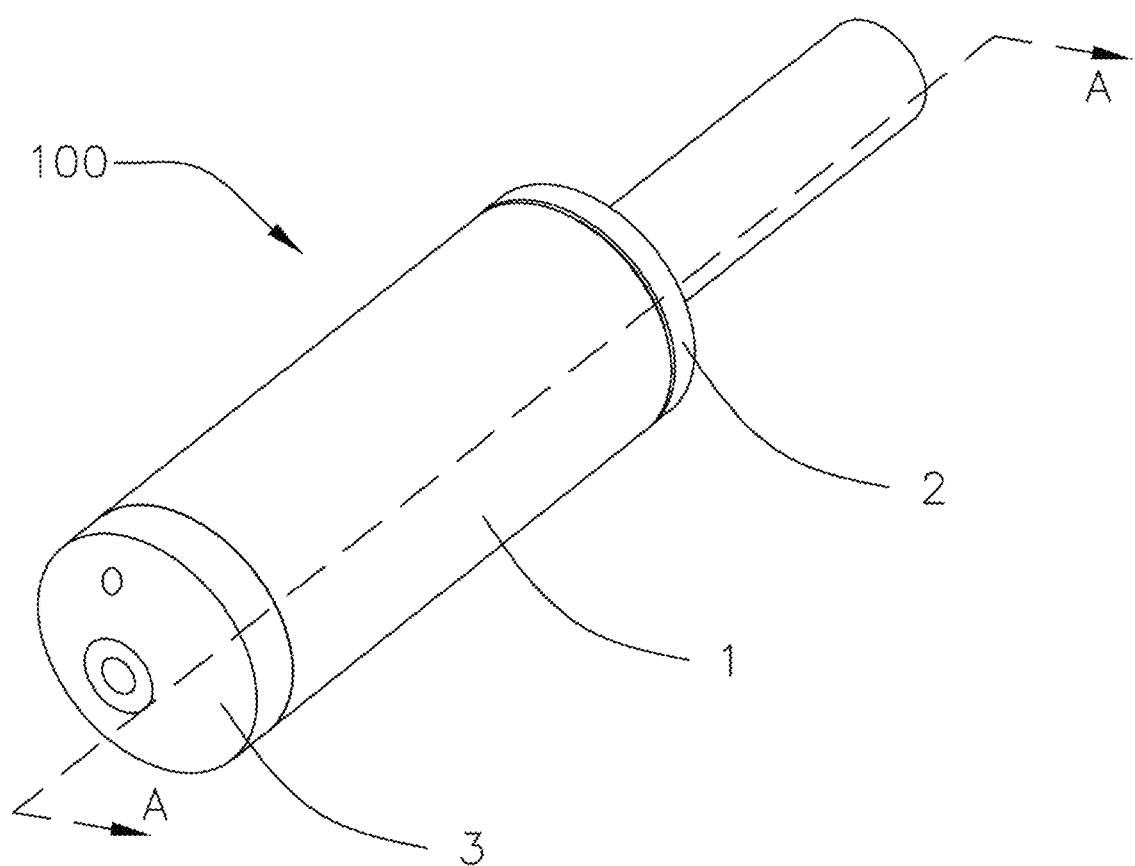
FIG. 1 is an isometric view of a linear driving mechanism in accordance with a first embodiment of the present invention.
Figure 2:
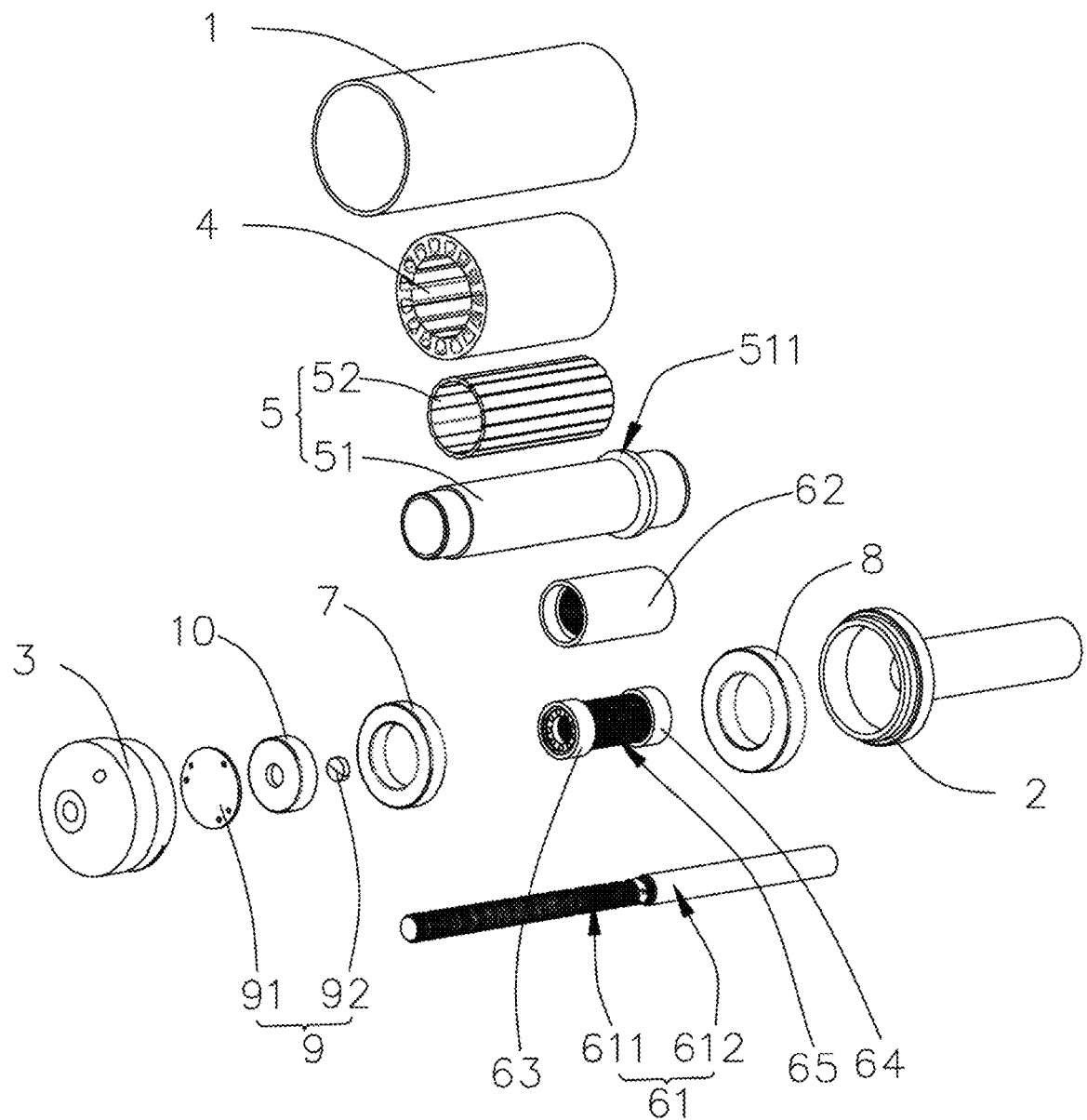
FIG. 2 is an exploded view of the linear driving mechanism in FIG. 1.
Figure 3:
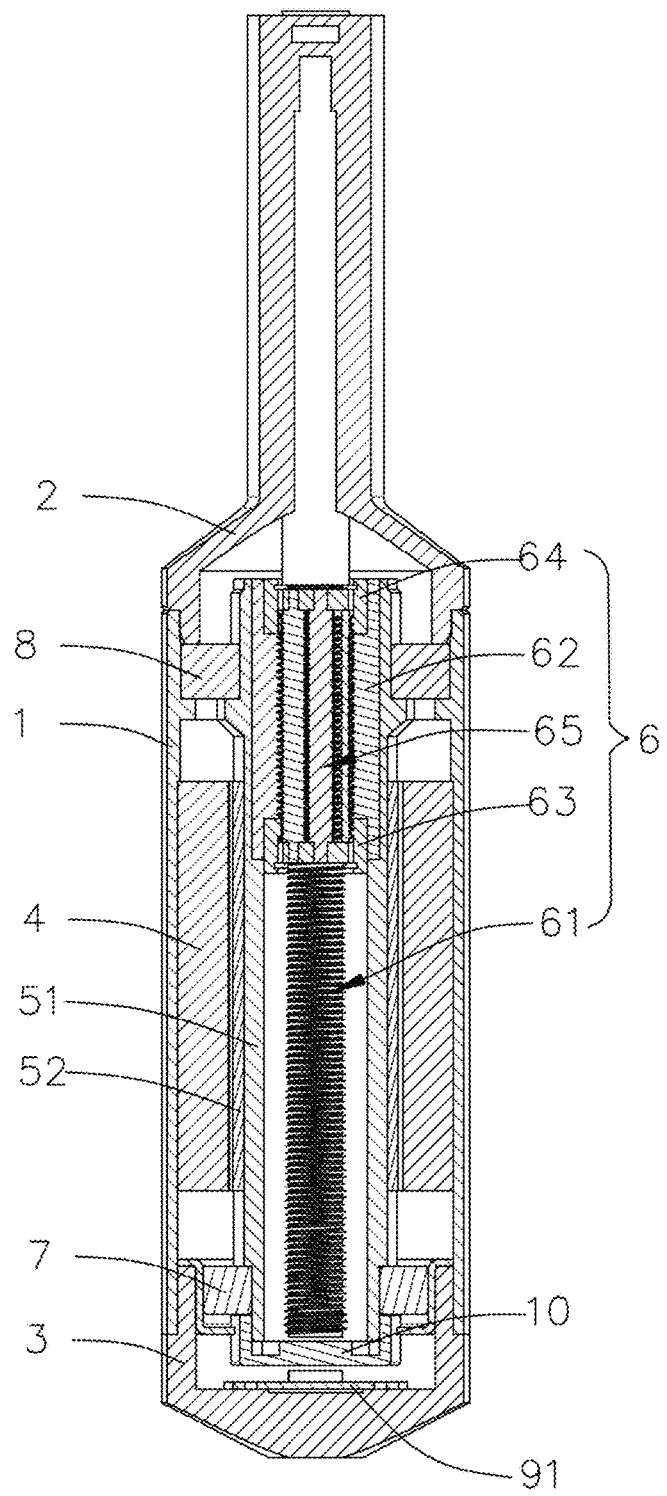
FIG. 3 is a cross-sectional view of the linear driving mechanism, taken along line A-A in FIG. 1.

Referring to FIGS. 1-3, a first embodiment of the present invention provides a linear driving mechanism 100, which includes a housing 1, front cover 2 and rear cover 3 fixed at opposite ends of the housing 1, a stator 4 provided inside the housing 1, and a rotor 5 set inside the stator 4 and in a hollow form, where the stator 4 drives the rotation of the rotor 5; the linear driving mechanism 100 further includes a rolling lead screw 6 fitted inside the rotor 5, a first bearing 7 fitted inside the rotor 5 and fixed at one end of the rear cover 3, and a second bearing 8 fitted around the rolling lead screw 6 and fixed inside the housing 1.

In this implementation, the front cover 2 and the back cover 3 are fixed to the casing 1 using welding process to enhance the stability of the connection.

Specifically, the rotor 5 comprises a hollow rotor shaft 51 set within the housing 1, and multiple permanent magnets 52 spaced and fixed on the outer wall of the rotor shaft 51; the multiple permanent magnets 52 are spaced from the stator 4, and the first bearing 7 and the second bearing 8 are respectively fitted on the rotor shaft 51.

In this embodiment, the motor formed by the stator 4 and the rotor 5 together is an 8-pole 9-slot structure or a 10-pole 12-slot structure or a 14-pole 12-slot structure or a 16-pole 12-slot structure. Here, "pole" refers to a permanent magnet pole, and "slot" refers to a stator slot.

Specifically, the lead screw 6 includes a lead screw 61 set on the inner peripheral side of the rotor 5 and passing through the center of the front cover 2, and a screw nut 62 sleeved on the lead screw 61 for forming a transmission pair with the lead screw 61; the screw nut 62 is fixedly sleeved around the inner peripheral side of the rotor 5 near the front cover 2. The rotor 5 rotates to drive the screw nut 62 to rotate, thereby causing the screw nut 62 to rotate and drive the lead screw 61 to achieve linear telescopic motion.

In this embodiment, the screw nut 62 is fixedly sleeved around the inner peripheral side of the rotor shaft 51 near the front cover 2, which improves the integration degree of the rolling lead screw 6. Further, the screw nut 62 has a smaller length, which reduces the manufacturing difficulty and improves the efficiency.

The rotor 5 extends radially outward near one end of the front cover 2 to form a protrusion; the screw nut 62 is formed on the inner peripheral side of the protrusion near the center screw 61.

The rolling lead screw 6 is a planetary rolling lead screw, with an internal thread structure set on one side of the screw nut 62 close to the central screw rod 61; the central screw rod 61 includes a screw body 611 set on the inner peripheral side of the rotor 5 and an extension portion 612 extending from one end of the screw body 611 close to the front cover 2, with an external thread structure set on the outer peripheral side of the screw body 611; the screw nut 62 engages with the external thread structure of the screw body 611 through the internal thread structure to achieve rotational connection.

The screw nut 62 can be understood as the internal thread structure part in the pivot 51, or as the part of the pivot 51 with an internal thread structure, or as the inner peripheral side of the pivot 51 with an internal thread structure.

The planetary roller screw rod 6 includes a first gear ring 63 and a second gear ring 64 fixed at both ends of the screw nut 62 of the screw rod, and several annular screw pillars 65 spaced around the central screw rod 61. Each annular screw pillar 65 is provided with external screw thread structures on its outer peripheral side; the two ends of each annular screw pillar 65 are respectively set in the first gear ring 63 and the second gear ring 64 to form a rotating connection, and the external screw thread structures of each annular screw pillar 65 respectively mesh with the external screw thread structures of the screw rod body 611, and the external screw thread structures of each annular screw pillar 65 also respectively mesh with the internal screw thread structures of the screw nut 62. The internal thread structure of the screw nut 62 is formed at an inner periphery of a middle portion of the screw nut 62. That is, in this embodiment, the rolling lead screw 6 is a planetary roller screw rod.

The circular lead screw column 65 is a column with a threaded structure on the outer wall, with flat structures at both ends for easy installation, but the part in contact with the first gear ring 63 or the second gear ring 64 needs to be equipped with a gear structure.

The first gear ring 63 and the second gear ring 64 are in contact with the two ends of the annular threaded column 65 through gear meshing, to achieve the rotation of the two ends of the annular threaded column 65 respectively set between the first gear ring 63 and the second gear ring 64.

The length of the lead screw body 611 is the same as the length of the rotor 5, equals the length of the lead screw body 611 to the length of the spindle 51. Of course, as described in actual needs, the length of the lead screw body 611 can be greater than the length of the spindle 51, or at least can ensure that the internal thread structure of the lead screw column 65 and the external thread structure of the annular lead screw column 65 can engage.

Specifically, the first bearing 7 and the second bearing 8 are located on opposite sides of the stator 4 and are spaced apart from the stator 4.

In this embodiment, the outer wall of the rotor 5 protrudes to form a shaft stop 511, the second bearing 8 abuts one end of the front cover 2 near the front cover 2, and the other end of the second bearing 8 away from the front cover 2 abuts the shaft stop 511, so as to ensure that the second bearing 8 can restrict the axial direction of the drive shaft 51 and the screw nut 62. Correspondingly, the first bearing 7 can also be fixed in a similar or similar manner.

The axial stop 511 is set on the rotor shaft 51 of the rotor 5; the first bearing 7 is a deep groove ball bearing; the second bearing 8 is a four-point contact ball bearing or angular contact ball bearing.

Specifically, the linear driving mechanism 100 further includes a position sensor 9; the position sensor 9 comprises a collecting portion 91 fixed on the rear cover 3 and a rotating portion 92 fixed at one end of the rotor 5 near the rear cover 3, with the collecting portion 91 being relatively and spaciously arranged with the rotating portion 92.

In this embodiment, the straight-line drive mechanism 100 further includes a base 10 mounted at one end fixedly near the back cover 3 of the rotor 5 and sealing the end of the rotor 5 near the back cover 3; the rotating part 92 is fixed to the base 10; the base 10 abuts the first bearing 7 on the side near the back cover 3.

The base consists of 10 sets placed on the rotor shaft 51, and the edges of the two joining surfaces are welded to enhance the stability of the connection.

Position sensor 9 is a Hall position sensor 9, magnetic encoding position sensor 9, or optical encoding position sensor 9. If a Hall position sensor 9 is chosen, simply fix the Hall position sensor 9 to the base 10.

In this embodiment, when the rotor 5 of the linear driving mechanism 100 rotates, the screw nut 62 does not move axially while rotating; the rotating shaft 51 transmits torque to the central lead screw 61 through the thread structure and gear structure, converting it into thrust. Due to the screw nut 62 being restricted from axial movement, the central lead screw 61 is driven to move axially as described in the interaction of forces.

The linear driving mechanism 100 of this embodiment integrates the rolling lead screw 6 and the rotor 5 by forming the screw nut 62 of the rolling lead screw 6 on the inner peripheral side near the front cover 2 of the rotor 5. This not only reduces the volume of the linear driving mechanism 100 to meet the miniaturization requirements, but also enhances the load-bearing capacity of the rolling lead screw 6. Moreover, since the screw nut 62 is not completely formed along the entire length of the rotor 5, it also reduces the processing difficulty of the screw nut 62.

The linear driving mechanism 100 described in this embodiment includes a screw nut 62 integrates with the rotor 5 by fixedly sleeving the screw nut around the inner periphery of the rotor 5, which reduces the volume of the linear driving mechanism 100, and improves the bearing capacity of the rolling lead screw 6. In addition, the length of the screw nut is shortened, which enables to manufacture the screw nut 62 separately, and to lower the manufacturing difficulty of the screw nut 62.

Second Embodiment

Figure 4:
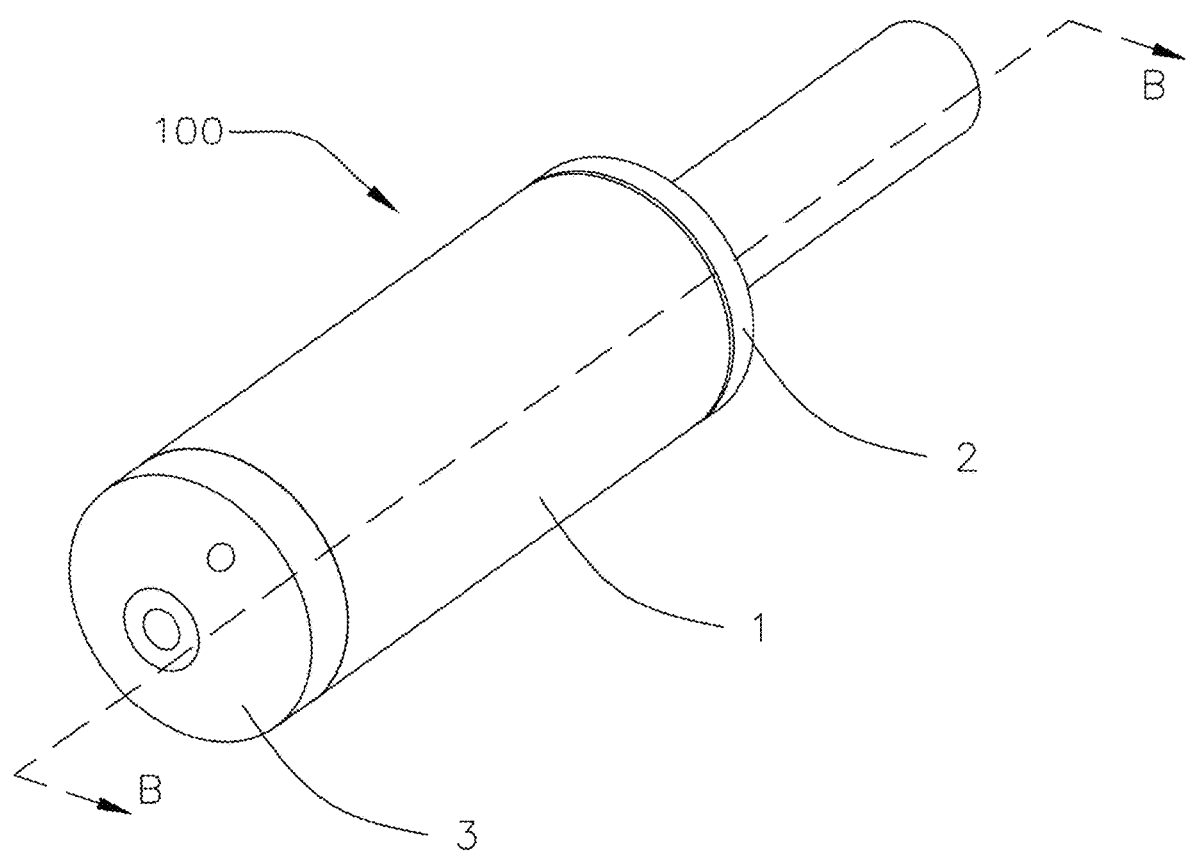
FIG. 4 is an isometric view of a linear driving mechanism in accordance with a second embodiment of the present invention.
Figure 5:
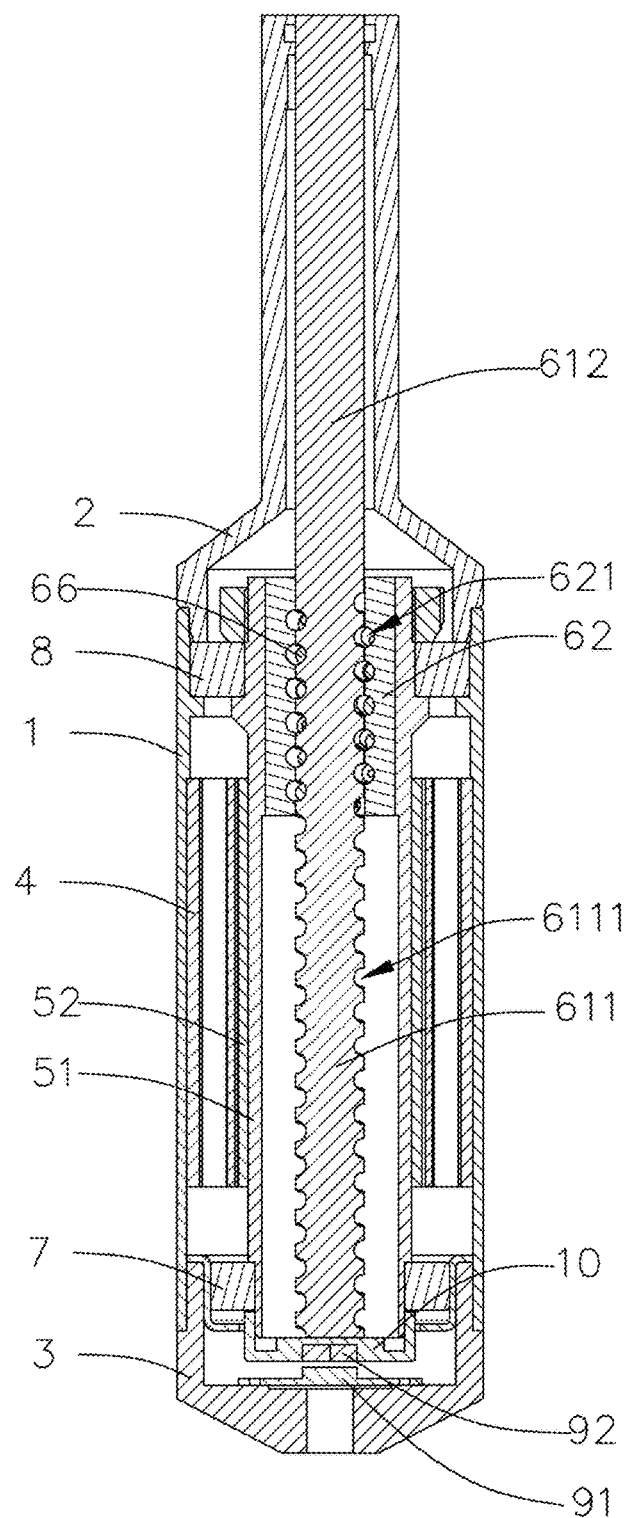
FIG. 5 is a cross-sectional view of the linear driving mechanism, taken along line B-B in FIG. 4.

Referring to FIGS. 4-5, the difference between a second embodiment of the present invention and the first embodiment is that in this embodiment, the screw nut 62 near one side of the central screw rod 61 does not have a threaded structure, and the outer peripheral side of the screw body 611 also does not have a threaded structure; the rolling lead screw 6 does not have the first gear ring 63, the second gear ring 64, and the annular screw column 65. In other words, in this embodiment, the rotation connection between the screw nut 62 and the central screw rod 61 is not achieved through a threaded structure connection.

Specifically, in the embodiments of the present invention, as shown in FIGS. 4-5, the rolling lead screw 6 is a ball screw, with multiple first ball grooves 621 formed by recesses on one side of the screw nut 62 near the central lead screw 61 at intervals; the central lead screw 61 includes a lead screw body 611 arranged on the rotor 5 and an extension part 612 extending from one end of the lead screw body 611 near the front cover 2, with multiple second ball grooves 6111 formed by recesses on the outer peripheral side of the lead screw body 611 at intervals; the rolling lead screw 6 also includes several balls 66, each of which is sandwiched between a first ball groove 621 and a second ball groove 6111 to enable a rolling connection between the screw nut 62 and the lead screw body 611.

The threaded rod nut 62 can be understood as a structural part with multiple first ball grooves 621 in the rotating shaft 51, or a portion of the rotating shaft 51 with multiple first ball groove 621 structures, or the inner peripheral portion of the rotating shaft 51 with multiple first ball groove structures.

The present embodiment achieves the rotational connection between the screw nut 62 and the central lead screw 61 in a rolling manner, which means that the rolling lead screw 6 in this embodiment is a ball screw. Although the method of achieving the rotational connection between the screw nut 62 and the central lead screw 61 in this embodiment is different from that in embodiment 1, the technical effect achieved by the linear driving mechanism 100 in this embodiment is the same as that achieved by the linear driving mechanism 100 in embodiment 1, which is not repeated here.

The way in which the planetary roller screw in embodiment 1 and the ball screw in embodiment 2 move the central screw rod nut 62 to drive the central screw rod 61 in a linear motion differs from the standard type in the relevant technology, because both the planetary roller screw in embodiment 1 and the ball screw in embodiment 2 rotate the screw nut 62 to drive the central screw rod 61 in a linear motion.

In addition, after the linear driving mechanism 100 of the present invention is applied to the joint of the robot, the robot can also achieve the technical effects achieved by the linear driving mechanism 100 in embodiment 1 or embodiment 2.

The foregoing is merely illustrative of embodiments of the present invention, and it should be noted that modifications may be made to those skilled in the art without departing from the spirit of the invention but are intended to be within the scope of the invention.

What is claimed is:
1. A linear driving mechanism comprising:
   a housing;
   a front cover and a rear cover fixed respectively at opposite ends of the housing;
   a stator inside the housing;
   a hollow rotor inside the stator for being driven to rotate by the stator;
   a rolling lead screw sleeved inside the rotor;

a first bearing sleeved on the rotor and fixed at one end of the rear cover;

a second bearing sleeved on the rolling lead screw and fixed inside the housing; wherein the rolling lead screw comprises a central screw rod set on an inner peripheral side of the rotor and passing through the center of the front cover, and a screw nut forming a transmission pair with the central screw rod;

the screw nut is fixedly sleeved around the inner peripheral side of the rotor near the front cover end; and the rolling lead screw is a planetary rolling screw; the screw nut includes an internal thread structure on one side close to the central screw rod; the central screw rod includes a screw body set on the inner peripheral side of the rotor and an extension portion extending from one end of the screw body near the front cover; an outer peripheral side of the screw body includes an external thread structure;

wherein the rolling lead screw further includes a first and second gear rings fixed at the two ends of an inner peripheral side of the screw nut, and a plurality of annular lead screw columns spaced around the central lead screw, each annular lead screw column having lead screw external thread structures on an outer peripheral side thereof; each end of each annular lead screw column is respectively set in the first gear ring and the second gear ring to form a rotational connection; the lead screw external thread structures of each annular lead screw column respectively mesh with the external thread structures of the lead screw body, and the lead screw external thread structures of each annular lead screw column also respectively mesh with the internal thread structures of the screw nut; the internal thread structure of the screw nut is formed at an inner periphery of a middle portion of the screw nut;

the rotor drives the screw nut to rotate, thereby driving the central screw rod to achieve a linear telescopic movement.

2. The linear driving mechanism as described in claim 1, wherein a length of the screw body equals a length of the motor, and the screw nut is fixed at an end of the rotor near the front cover.

3. The linear driving mechanism as described in claim 1, wherein the first bearing and the second bearing are respectively located on the opposite sides of the stator and spaced apart from the stator; an outer wall of the rotor protrudes for forming a shaft stop; one end of the second bearing near the front cover abuts against the front cover; and one end of the second bearing far from the front cover abuts against the shaft stop.

4. The linear driving mechanism as described in claim 1, wherein a motor formed by the stator and the rotor together is an 8-pole-9-slot structure, or a 10-pole-12-slot structure, or a 14-pole-12-slot structure, or a 16-pole-12-slot structure.

5. The linear driving mechanism as described in claim 1, wherein the rotor comprises a hollow rotor shaft disposed within the housing and a plurality of permanent magnets spaced apart and fixed to the outer wall of the rotor shaft; the multiple permanent magnets are spaced apart from the stator; the first bearing and the second bearing are respectively sleeved on the rotor shaft; and the screw nut is fixedly sleeved around the inner peripheral side of the rotor shaft near the front cover.

6. The linear driving mechanism as described in claim 1, further comprising a position sensor, wherein the position sensor comprises a collecting part fixed to the rear cover and a rotating part fixed to one end of the rotor near the rear cover, with the collecting part being opposite and spaced from the rotating part.

7. The linear driving mechanism as described in claim 6, further including a base which is fixedly sleeved around and sealing an end of the rotor near the rear cover, wherein the rotating part is fixed with the base.

8. A robot, comprising limb joints and the linear driving mechanism as described in claim 1 applied to the limb joints.

* * * * *